United States Patent
Appleford et al.

(10) Patent No.: US 12,358,205 B2
(45) Date of Patent: Jul. 15, 2025

(54) PULP FIBRE MATERIAL PROCESSING TOOL FOR USE IN A THERMOFORMING PROCESS

(71) Applicant: VARDEN PROCESS PTY LTD, Clayton (AU)

(72) Inventors: Mark Appleford, Clayton (AU); Stuart Gordon, Clayton (AU)

(73) Assignee: VARDEN PROCESS PTY LTD, Clayton (AU)

( * ) Notice: Subject to any disclaimer, the term of this patent is extended or adjusted under 35 U.S.C. 154(b) by 358 days.

(21) Appl. No.: 17/777,803

(22) PCT Filed: Nov. 19, 2020

(86) PCT No.: PCT/AU2020/051248
§ 371 (c)(1),
(2) Date: May 18, 2022

(87) PCT Pub. No.: WO2021/097525
PCT Pub. Date: May 27, 2021

(65) Prior Publication Data
US 2022/0402191 A1    Dec. 22, 2022

(30) Foreign Application Priority Data
Nov. 19, 2019 (AU) ................................ 2019904361

(51) Int. Cl.
*B29C 51/36* (2006.01)
*B29C 51/42* (2006.01)
(Continued)

(52) U.S. Cl.
CPC .............. *B29C 51/36* (2013.01); *B29C 51/42* (2013.01); *B29C 51/46* (2013.01); *D21J 3/00* (2013.01); *D21J 7/00* (2013.01)

(58) Field of Classification Search
CPC ......... B29C 51/36; B29C 51/42; B29C 51/46; B29C 43/36; B29C 43/02; B29C 33/10;
(Continued)

(56) References Cited

U.S. PATENT DOCUMENTS 9,976,262 B2 * 5/2018 Kuo ..................... B30B 15/022
10,113,271 B2 * 10/2018 Gordon ..................... D21J 5/00
(Continued)

FOREIGN PATENT DOCUMENTS

CN         201292485 Y      8/2009
CN         102409578 A      4/2012
(Continued)

OTHER PUBLICATIONS

International Search Report from corresponding PCT Application No. PCT/AU2020/051248, Dec. 21, 2020.

*Primary Examiner* — Jose A Fortuna
(74) *Attorney, Agent, or Firm* — Workman Nydegger (57) ABSTRACT

A tool for a thermoforming process to form a moulded product from wet pulp fibre material includes two or more moulds each having a moulding surface, an actuator assembly, and a fluid extraction system. At least one of the moulds is displaceable by the actuator assembly between first and second positions and has fluid extraction paths extending through the mould to transport fluid away from the moulding surface. One of the moulds has a first layer that is substantially rigid to form a support member and is in communication with a heating subsystem of the fluid extraction system, and a second layer that is, in use of the tool, between the first layer and the wet pulp fibre material. The second layer is formed of a material that has interconnected internal voids forming part of the fluid extraction paths and has a lower heat transfer coefficient than the first layer.

20 Claims, 8 Drawing Sheets

(51) Int. Cl.
*B29C 51/46* (2006.01)
*D21J 3/00* (2006.01)
*D21J 7/00* (2006.01)

(58) Field of Classification Search
CPC ... B29C 43/006; B29C 43/52; B29C 33/3828; B29C 43/56; B29C 2033/385; D21J 3/00; D21J 7/00; B29K 2093/00; B29K 2201/00
See application file for complete search history.

(56) References Cited

U.S. PATENT DOCUMENTS

| | | |
|---|---|---|
| 2009/0139678 A1 | 6/2009 | Nilsson et al. |
| 2016/0168801 A1* | 6/2016 | Kuo .................... D21J 3/00 162/194 |
| 2017/0370049 A1* | 12/2017 | Andersson ............ B22F 3/1109 |
| 2019/0048531 A1* | 2/2019 | Gordon .................. B41F 16/002 |
| 2021/0269983 A1* | 9/2021 | Pierce ........................ D21J 7/00 |
| 2022/0136174 A1* | 5/2022 | Chung .................... D21H 17/55 220/669 |
| 2022/0288888 A1* | 9/2022 | Appleford ............. B32B 29/005 |
| 2022/0402191 A1* | 12/2022 | Appleford ............... B29C 43/36 |

FOREIGN PATENT DOCUMENTS

| | | | |
|---|---|---|---|
| CN | 107587389 A | 1/2018 | |
| JP | H01176513 A | 7/1989 | |
| JP | 2002103437 A | 4/2002 | |
| MY | 197847 A * | 7/2023 | ............ D21H 17/17 |
| WO | 2006057609 A1 | 6/2006 | |
| WO | 2013047753 A1 | 4/2013 | |
| WO | WO-2014019027 A1 * | 2/2014 | ............ B41F 16/002 |
| WO | WO-2021071870 A1 * | 4/2021 | ............ B65D 25/34 |
| WO | WO-2023180808 A2 * | 9/2023 | ............... B65D 1/00 |
| WO | WO-2023194032 A1 * | 10/2023 | ............... B26D 7/26 |
| WO | WO-2023227879 A1 * | 11/2023 | ............ B29C 33/50 |

* cited by examiner

SCALE: 40 mm = 1 mm

Figure 9

SCALE: 40 mm = 1 mm

Figure 10

Figure 11

# PULP FIBRE MATERIAL PROCESSING TOOL FOR USE IN A THERMOFORMING PROCESS

FIELD OF THE INVENTION

The present invention relates to a pulp fibre material processing tool for use in a pulp fibre thermoforming process.

BACKGROUND

Thermoforming processes are suitable for use in forming molded pulp fibre products from wet pulp fibre materials to cure the material to increase the structural rigidity of the material. Curing the material achieves high internal bond strengths through the application of heat and pressure to the material.

For example, thermoforming can be used in moulding pulp fibre products, in which wet pulp fibre is the mouldable material. To this end, a wet pulp fibre pre-form can be formed from a suspension of pulp fibres in liquid. The wet pulp fibre pre-form is then transferred to a press that has tool with two (or more) moulds that each define part of an external surface of the moulded pulp fibre product. The tool is heated such that heat is transferred from the tool to the pulp fibre pre-form, which facilitates extraction of the fluid component of the suspension. The wet pulp fibre pre-form is also compressed between the moulds to facilitate removal of fluid, and bond solid components of the suspension.

In the example of pulp fibre products produced using a thermoforming process, the external surfaces can be smooth and well defined, particularly when compared with product produced by basic (in other words, "traditional") pulp fibre moulding processes. Thermoformed pulp fibre material is useful for transport and packaging of dry food produce (such as fruits and vegetables), and electrical/industrial products. However, it is considered that known thermoforming processes have limited application due to the solubility and porosity of the moulded pulp fibre products.

There is a need to address the above, and/or at least provide a useful alternative.

SUMMARY

There is provided a tool for use in a thermoforming process to form a moulded product from wet pulp fibre material, the tool comprising:
two or more moulds that each have a moulding surface that is shaped to substantially define a portion of the external surface of the moulded product; at least one of the moulds being a displaceable mould that is displaceable between a first position that corresponds with the maximum separation of the moulds, and a second position that corresponds with the minimum separation of the moulds; and fluid extraction paths that extend through at least one of the moulds through which fluid is transportable away from the respective moulding surface;
an actuator assembly that is operable to displace the displaceable mould, and that includes at least one actuator to effect displacement of the displaceable mould;
a fluid extraction system that includes:
a suction subsystem that is in communication with the fluid extraction paths and is operable to induce a negative pressure in the fluid extraction paths to thereby draw fluid that is at the moulding surface of the respective mould through the fluid extraction paths so as to reduce the moisture content of the pulp fibre material, and
a heating subsystem that is operable to heat at least the mould having the fluid extraction paths,
wherein at least one of the moulds includes:
a first layer that is substantially rigid so as to form a support member of the mould, and that is in communication with the heating subsystem so that in use of the tool, an elevated temperature can be induced in the first layer, and a second layer that, in use of the tool to form a moulded product from wet pulp fibre material, is between the first layer and the wet pulp fibre material, and wherein the second layer is formed of a material that has interconnected internal voids forming part of the fluid extraction paths, and has a lower heat transfer coefficient than the first layer.

Thus, in use, the tool can be operated such that:
the heating subsystem heats the first layer to a temperature that exceeds the liquid-gas transition temperature of the liquid component of the wet pulp fibre material,
the actuator assembly displaces the displaceable mould to compress wet pulp fibre material between the mould surfaces, and
a negative pressure is induced in the fluid extraction paths by the suction subsystem,
whereby liquid within the wet pulp fibre material migrates into the second layer, within which heat from the first layer causes liquid to change to a gas.

In at least some embodiments, the second layer defines the mould surface and, in use of the tool to form a moulded product from wet pulp fibre material, contacts the wet pulp fibre material.

In some embodiments, the first and second layers are formed of different materials.

The second layer can be formed of one or more materials that are resiliently compressible. In some instances, material within the second layer is hydrophobic, hydrophilic, or a combination thereof.

In some embodiments, the second layer is hydrophilic at the mould surface, and is hydrophobic at the interface with the first layer. In such embodiments, the second layer may be formed of blended materials.

Preferably, the tool further comprises a controller that is configurable to adjust operational characteristics of the fluid extraction subsystem in use of the tool. Alternatively or additionally, the controller is configurable to adjust the displacement force applied by the actuator to the displaceable mould during displacement of the displaceable mould towards the second position.

Preferably, the controller is configurable to enable adjustment any one or more of:
the operating characteristics of the heating subsystem,
the operating characteristics of the suction subsystem, and
the displacement force and/or displacement rate of the actuator during displacement of the displaceable mould towards the second position,
such that, during use of the tool to form a moulded product from wet pulp fibre material, a temperature gradient is formed within the mould that has the first and second layers in a direction generally perpendicular to the mould surface, such that the mould surface of the respective mould is at a temperature that is below the temperature of the first layer, and is below the liquid-gas transition temperature of the liquid component of the wet pulp fibre material.

In some embodiments, the controller is configurable to adjust the operating characteristics of the heating subsystem to thereby adjust the temperature in the first layer in each mould that has fluid extraction paths.

In embodiments in which the controller is configurable to adjust the operating characteristics of the heating subsystem, the tool can further comprise one or more temperature sensors that sense the temperature of the first layer in each mould that has fluid extraction paths, and wherein the controller is configured to receive electronic signals representative of the sensed temperature from the temperature sensors, and to adjust the heat transferred to the first layer of the respective mould by the heating subsystem based on the sensed temperature and a pre-determined temperature.

Alternatively or additionally, the controller can be configurable to adjust the operating characteristics of the suction subsystem to thereby adjust the pressure in the fluid extraction paths.

Preferably, the suction subsystem further includes at least one plenum chamber that is in communication with the fluid extraction paths, a vacuum pump having an intake, and conduits that interconnect the plenum chamber with the intake. In embodiments in which the controller is configurable to adjust the operating characteristics of the suction subsystem, the tool can further comprise one or more pressure sensors that sense the pressure within the plenum chamber, and wherein the controller is configured to receive electronic signals representative of the sensed pressure from the pressure sensors, and to adjust the operation of the vacuum pump to thereby adjust the pressure in the fluid extraction paths based on the sensed plenum chamber pressure and a pre-determined plenum chamber pressure.

In embodiments in which the controller is configurable to adjust the displacement force of the actuator during displacement of the displaceable mould towards the second position, the actuator assembly can further comprise at least one load sensor that senses the displacement force applied by the actuator to the displaceable mould during displacement of the displaceable mould towards the second position, and wherein the controller is configured to receive electronic signals representative of the sensed displacement force from the load sensor, and to adjust the displacement force applied by the actuator to the displaceable mould based on the sensed displacement force and a pre-determined displacement force.

Alternatively or additionally, the tool further comprises a position sensor that is configured for use in determining the position of the displaceable mould between the first and second positions, and wherein the controller is configured to receive electronic signals representative of the position of the displaceable mould, and to adjust the displacement force applied by the actuator to the displaceable mould, and/or to adjust the displacement rate of the displaceable mould during displacement of the displaceable mould towards the second position based on the sensed position of the displaceable mould.

Further, the controller can be configured to adjust the displacement force applied by the actuator to the displaceable mould during displacement of the displaceable mould towards the second position based on the rate of displacement of the displaceable mould towards the second position.

In some embodiments, the second layer is formed of a fibrous material, having internal voids formed between the fibres. The fibres can be natural, synthetic, or a combination thereof. In some examples, the second layer is formed of non-woven material(s).

In embodiments in which the second layer is hydrophilic at the mould surface and hydrophobic at the interface with the first layer, the fibrous material can have a hydrophilic sublayer at the mould surface, and a hydrophobic sublayer at the interface with the first layer. The hydrophilic sublayer can be formed of a first fibrous material, and the hydrophobic sublayer can be formed of a second fibrous material.

In certain embodiments, the second layer can included an intermediate region between the hydrophilic and hydrophobic sublayers, wherein within the intermediate region the first and second fibrous materials are intermingled.

Preferably, the second layer is releasably retained against the first layer. In some embodiments, the first and second layers have a mechanical interconnection that facilitates retaining the second layer against the first layer.

The first layer can include a set of projections that extend towards the mould surface, whereby in the assembled mould the projections extend into and engage the material of the second layer, to thereby inhibit removal of the second layer from the first layer. Preferably, each projection has a barb-like formation that catches the material of the second layer.

Alternatively or additionally, the first layer is formed of two or more component parts, wherein, when the mould is assembled, portions of the second layer material are captured between component parts of the first layer.

In embodiments in which the material of the second layer has thermoplastic characteristics, the mould can be assembled by a process that involves softening at least part of the second layer material, establishing interengagement of the second layer with surface irregularities in a contacting surface of the first layer, and solidifying the second layer.

In some further embodiments, the mould surface of at least one of the moulds in the tool is non-planar. In some embodiments, the mould surface of a first one of the moulds includes concave features, and the mould surface of a second one of the moulds includes convex features. The concave features in the mould surface of the first mould may be complementary of the convex features in the mould surface of the second mould.

In certain embodiments, a first one of the moulds has the first and second layers, and a second one of the moulds is formed of a substantially rigid material and the mould surface is defined by the substantially rigid material, and wherein the heating subsystem is operable to heat both the first and second moulds, and wherein the heating subsystem is operable to heat the second mould such that the mould surface of the respective mould is at a temperature that is below the liquid-gas transition temperature of the liquid component of the wet pulp fibre material.

Preferably, the heating subsystem is operable to heat the first and second moulds such that the mould surface of the second mould is at a temperature that is below the temperature of the mould surface of the first mould.

BRIEF DESCRIPTION OF THE DRAWINGS

In order that the invention may be more easily understood, embodiments will now be described, by way of example only, with reference to the accompanying drawings, in which.

DETAILED DESCRIPTION

FIGS. 1 to 8 show a tool 10 for use in a thermoforming process to form a moulded product P from wet pulp fibre material W. The tool 10 has two moulds that, in this illustrative embodiment are arranged to provide an upper mould 12a and lower mould 12b. Each of the moulds 12a, 12b has a moulding surface 14 that is shaped to substantially define a portion of the external surface of the moulded product P. The tool 10 operates on the wet pulp fibre material W to reduce the liquid content, and in doing so allows the establishment of bonds between the fibres and/or increases the strength of bonds between the fibres. Compared to the wet pulp fibre material W, the product P that is moulded using the tool 10 has a lower liquid content and increases dimensional stability.

Figure 1:
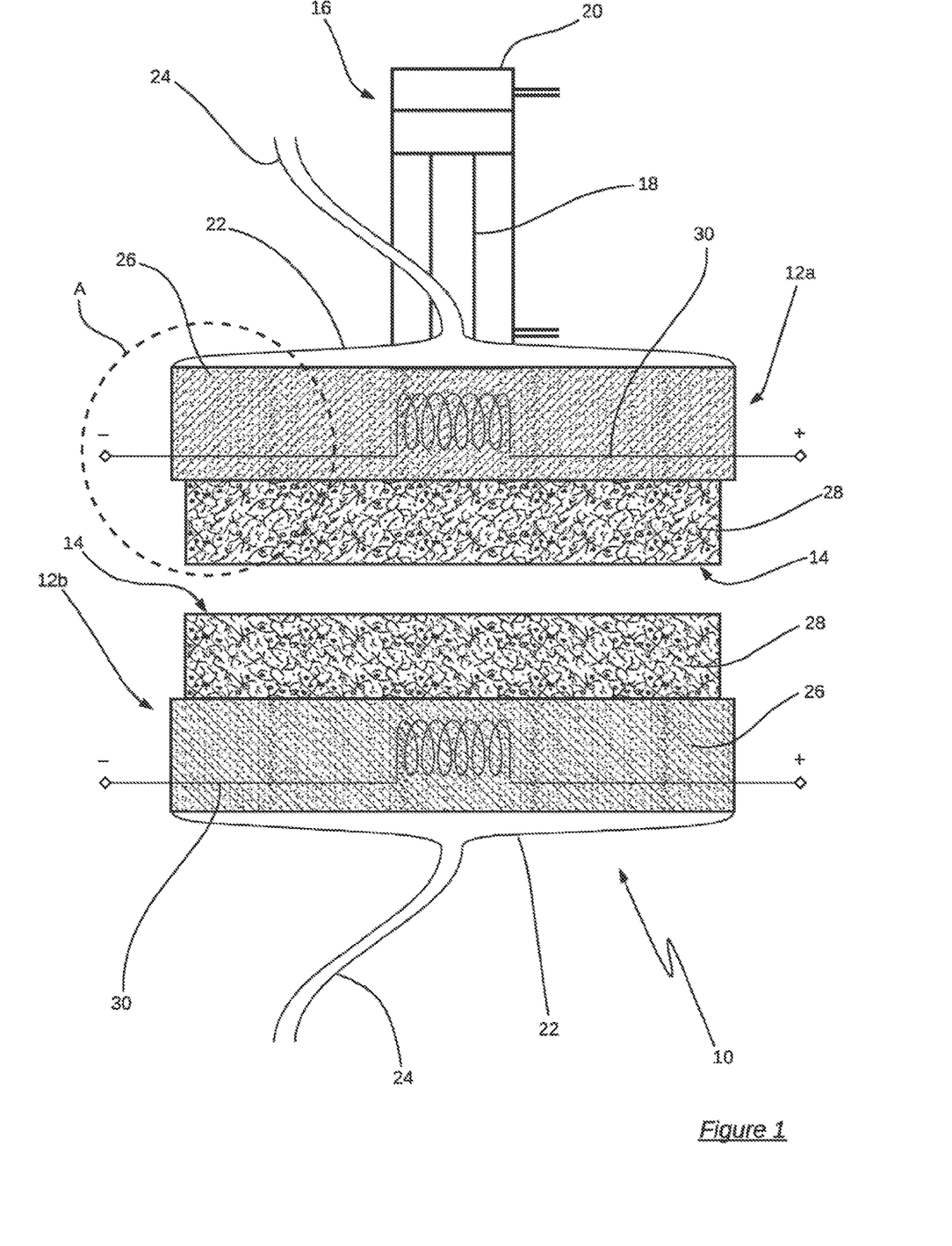
FIG. 1: is a schematic side elevation of a tool according to a first embodiment of the present invention.
Figure 3:
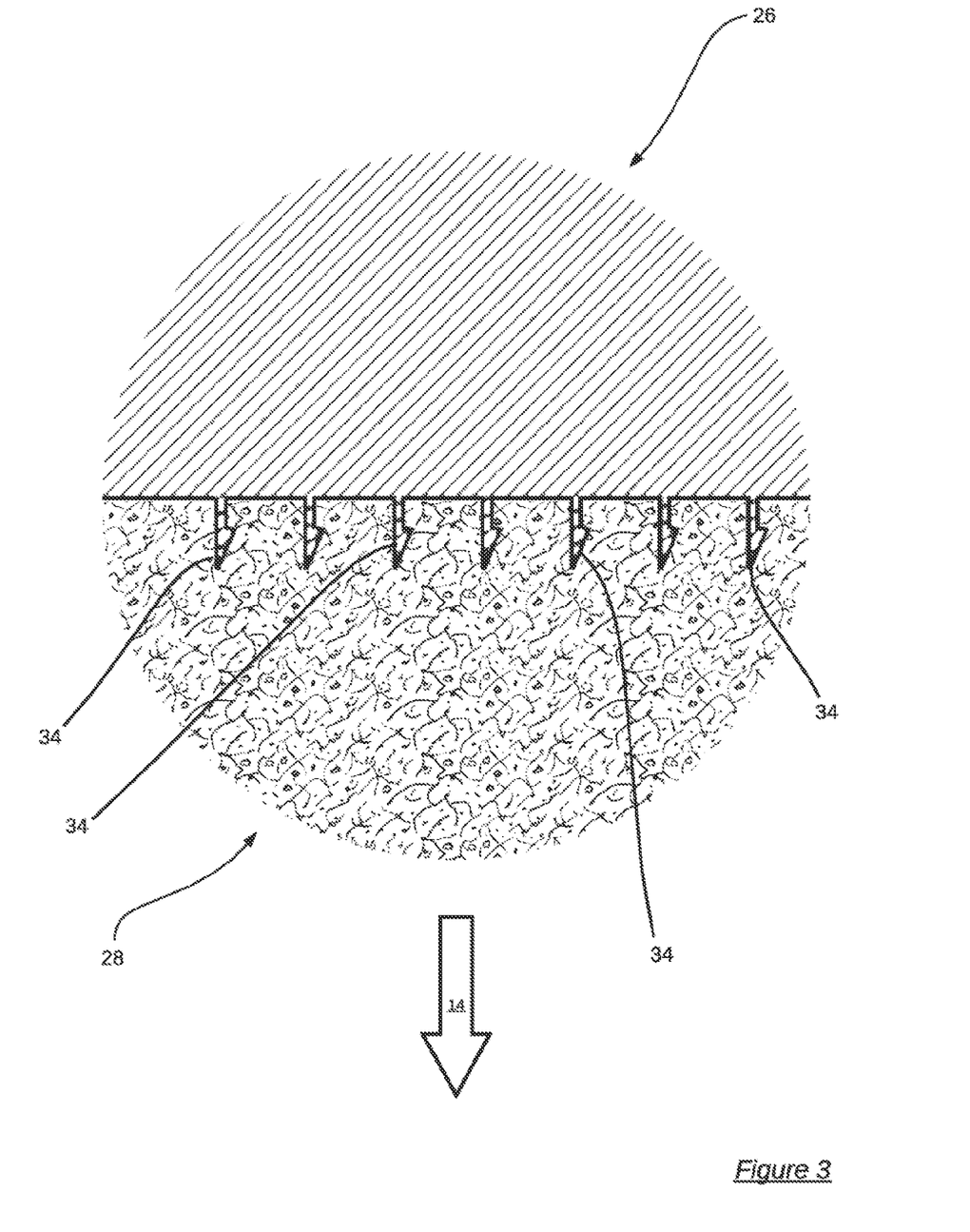
FIG. 3: is an enlarged view of Region B in FIG. 2.
Figure 6:
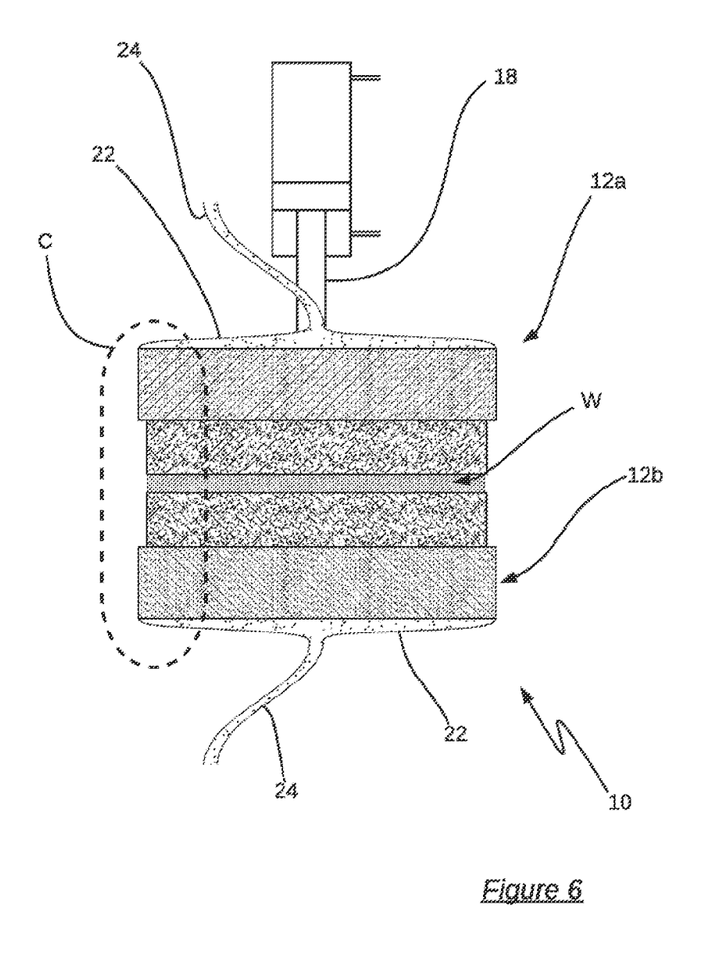
FIG. 6: is a schematic view of the tool of FIG. 1, showing a third stage of forming a moulded product from wet pulp fibre material.
Figure 7:
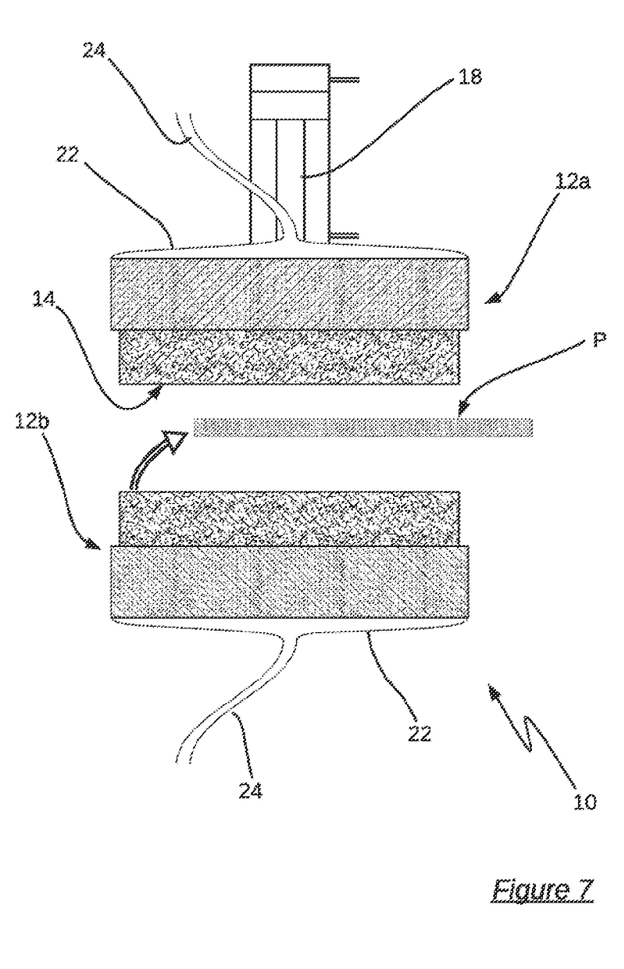
FIG. 7: is a schematic view of the tool of FIG. 1, with a moulded product formed from the wet pulp fibre material.

In this embodiment, the upper mould 12a is displaceable between a first position that corresponds with the maximum separation of the upper and lower moulds 12a, 12b, and a second position that corresponds with the minimum separation of the moulds 12a, 12b. FIGS. 1 and 3 illustrate the moulds 12a, 12b at the first position; and FIG. 6 illustrates the moulds 12a, 12b at the second position. The tool 10 includes an actuator assembly to displace the upper mould 12a. The actuator assembly has an actuator 16 with a piston 18 that is reciprocal within a cylinder 20. In this embodiment, the actuator assembly includes a drive fluid circuit (not shown) to move the piston 18. The drive fluid can be pneumatic or hydraulic.

In the example of FIG. 1, fluid extraction paths extend through both upper and lower moulds 12a, 12b. In use of the tool 10 to form the moulded product P from wet pulp fibre material W, fluid from within the wet pulp fibre material W is transported through the fluid extraction paths in each of the upper and lower moulds 12a, 12b and away from the respective moulding surface 14. The tool 10 further has a fluid extraction system that, in this embodiment, includes a suction subsystem, and a heating subsystem. The suction subsystem is in communication with the fluid extraction paths, and is operable to induce a negative pressure in the fluid extraction paths. In this embodiment, the heating subsystem that is operable to heat the moulds 12a, 12b.

Figure 2:
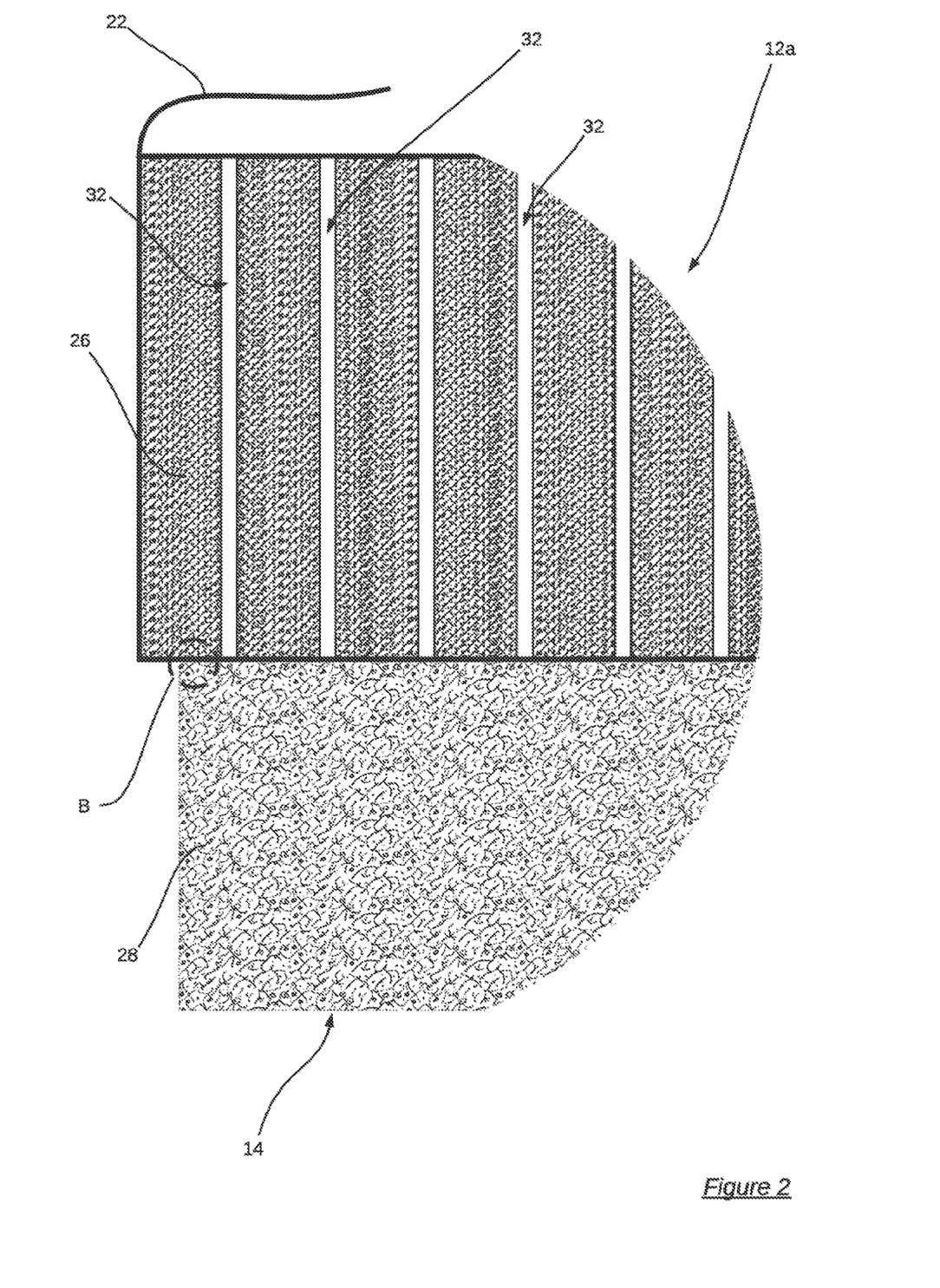
FIG. 2: is an enlarged view of Region A in FIG. 1.

In this embodiment, the suction subsystem includes two plenum boxes 22 that are each associated with a respective mould 12, and conduits 24 that interconnect with the plenum boxes 22. Each plenum box 22 defines a plenum chamber that is in communication with rear side of the respective mould 12, as shown in FIG. 2. The suction subsystem also includes a vacuum pump (not shown), and the conduits 24 are interconnected with an intake of the vacuum pump. Thus, when the vacuum pump is in operation a negative pressure is induced in the fluid extraction paths.

As shown particularly in FIG. 2, each of the upper and lower moulds 12a, 12b has two layers: a first layer 26 that is made of substantially rigid material, and a second layer 28. The heating subsystem of the tool 10 includes electrical resistance heating elements 30 within the first layers 26. The heating subsystem is configured so that the temperature of the first layer 26 can reach temperatures that exceed the liquid-gas transition temperature of the liquid component of the wet pulp fibre material W. As will be evident from FIGS. 4 to 8, the second layers 28 are arranged within the tool 10 such that, in use of the tool 10 to form a moulded product from wet pulp fibre material W, each second layer 28 is between the first layer 26 of that mould, and the wet pulp fibre material W.

The second layers 28 are formed of a material that has interconnected internal voids. Within each second layer 28, the internal voids form a part of the fluid extraction paths of the respective mould 12a, 12b. Further, the second layers 28 are formed of a material that has a lower heat transfer coefficient, compared to the material of the first layers 26.

For convenience, the upper and lower moulds 12a, 12b are referred to collectively hereinafter as "moulds 12".

FIGS. 4 to 8 illustrate stages in the use of the tool 10 to form a moulded product P from wet pulp fibre material W. The heating subsystem is operated to heat the first layers 26 to a temperature that exceeds the liquid-gas transition temperature of the liquid component of the wet pulp fibre material W.

Figure 4:
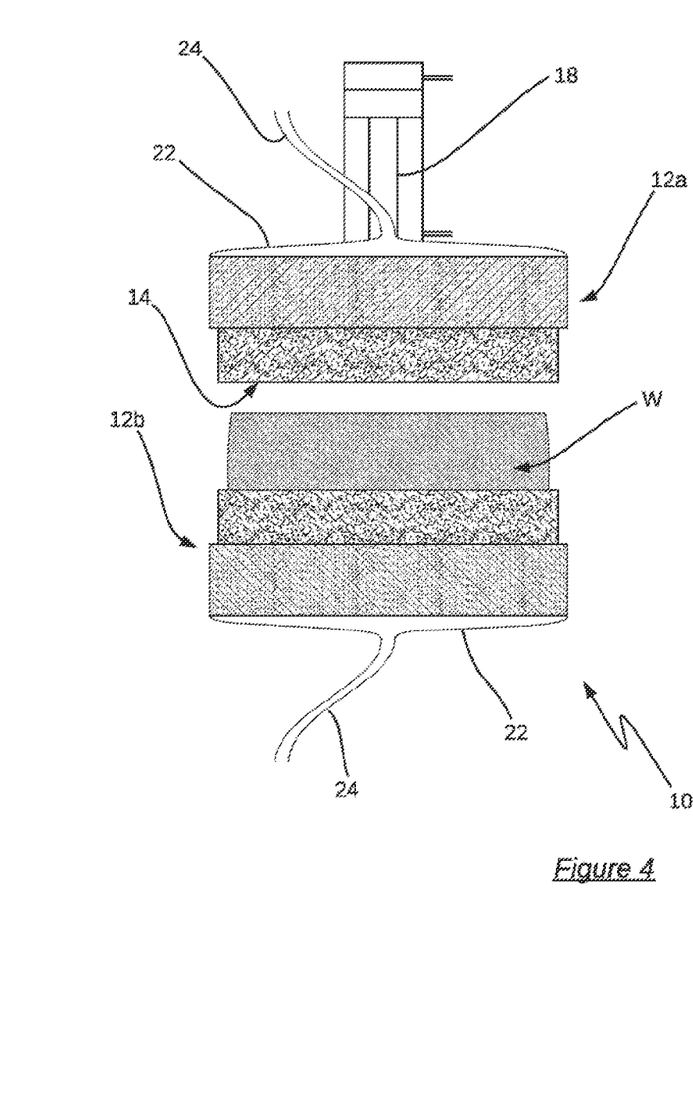
FIG. 4: is a schematic view of the tool of FIG. 1, showing a first stage of forming a moulded product from wet pulp fibre material.

Initially, with the moulds 12 spaced apart from one another, wet pulp fibre material W is positioned between the mould surfaces 14, which may be at the maximum separation of the moulds 12. In the example of FIGS. 4 to 8, the wet pulp fibre material W is placed on the mould surface 14 of the lower mould 12, as shown in FIG. 4. The wet pulp fibre material can be a slurry that is deposited onto the lower mould 12. Alternatively, the wet pulp fibre material can be a pulp fibre pre-form that has undergone processing step(s) to form the pre-form from a slurry. The processing step(s) may involve reducing the liquid fraction in the wet pulp fibre material from the original suspension of pulp fibre in liquid.

Figure 5:
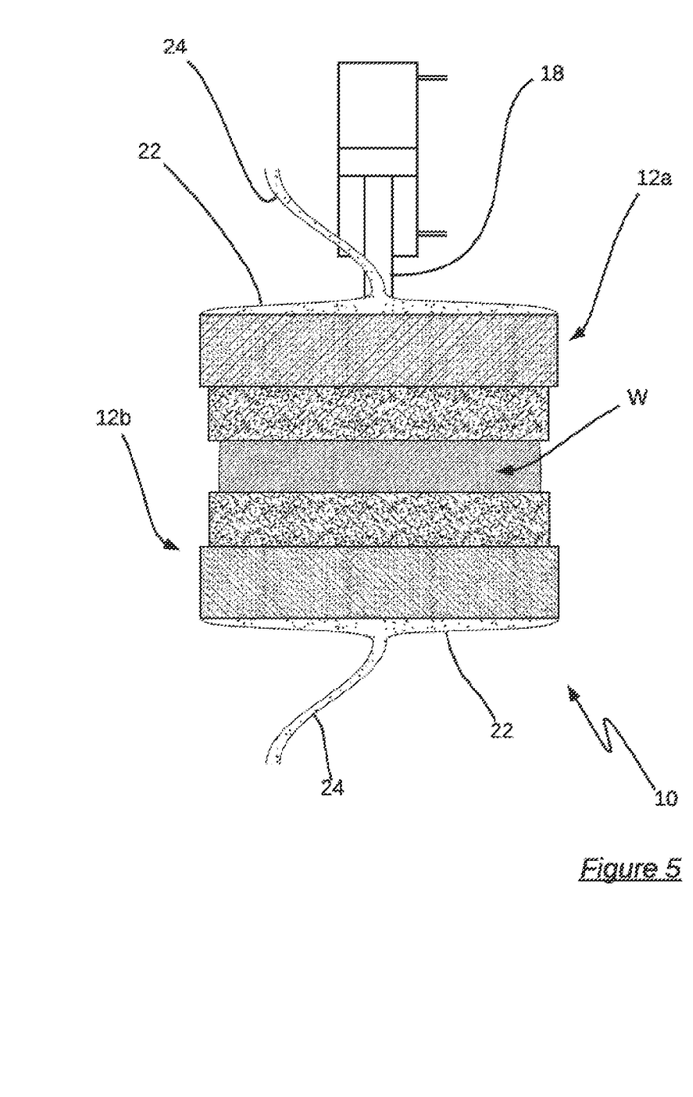
FIG. 5: is a schematic view of the tool of FIG. 1, showing a second stage of forming a moulded product from wet pulp fibre material.

As indicated in FIGS. 5 and 6, the actuator assembly is operated to displace the upper mould 12a towards the second position. In doing so, the tool 10 compresses the wet pulp fibre material W between the surfaces 14 of the moulds 12. Concurrently, the suction subsystem is operated to induce a negative pressure in the fluid extraction paths.

Figure 8:
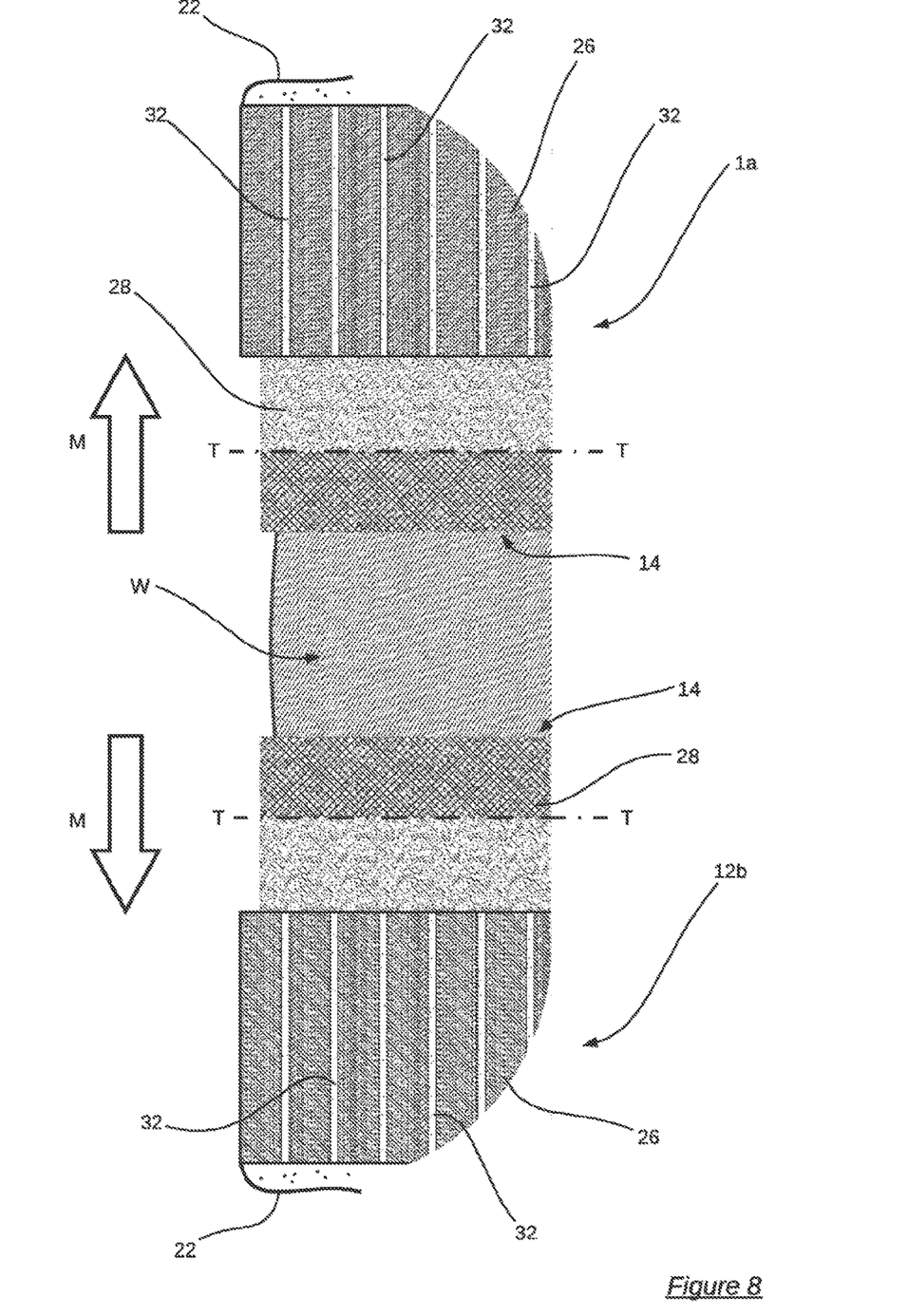
FIG. 8: is an enlarged view of Region C in FIG. 6.

As illustrated schematically in FIG. 8, as the actuator 16 applies a driving force to the upper mould 12a (downwardly in this example), liquid within the wet pulp fibre material W migrates (in other words, propagates) from the wet pulp material W into the second layers 28—as indicated by arrows M in FIG. 8. Heat from the first layers 26 transfers towards the wet pulp fibre material W. With appropriate operating parameters of the tool 10, the liquid from the wet pulp fibre material W that has migrated into the second layers 28 changes phase, from a liquid to a gas. In FIG. 8, the indicative position of this phase change (in other words, liquid-gas transition) is indicated schematically by broken lines T-T. However, it will be appreciated that the actual position of the phase change will depend on many factors, including local variations of temperature, suction pressure, and the applied driving force.

As will be appreciated, the above described operation results in liquid from the wet pulp fibre material W being removed. In other words, the liquid fraction of the wet pulp fibre material W decreases as the tool 10 acts on the wet pulp fibre material W. Conversely, the solid component fraction, including the pulp fibres, from the wet pulp fibre material W remains between the mould surfaces 14. The compressive loads acting on the pulp fibres reduce interstitial spaces between the fibres. With sufficient compression, the pulp fibres become very tightly packed, and interstitial spaces can be almost eliminated (although it will be appreciated that the extent of packing and/or the capacity to eliminate interstitial spaces is at least partly dependent on properties of the pulp fibres). As the pulp fibre material cures, bonds are formed between the pulp fibres, and the bonded pulp fibre material can retain the compressed configuration.

A tool according to described embodiments can be operated to form a moulded pulp fibre product from wet pulp fibre material, whereby the fluid component of the wet pulp fibre material is extracted from the pulp fibre material in its liquid form, and such that transition of the fluid component to its gaseous phase (including the liquid water to steam transition) occurs within the second layer(s). In other words, the heat transfer to the wet pulp fibre material and the rate at which the liquid component is extracted from that material are such that the formation of steam occurs externally of the pulp fibres. This in turn avoids formation of steam between the pulp fibres, which provides significant benefits to the final moulded pulp fibre product, as discussed further below.

Figure 9:
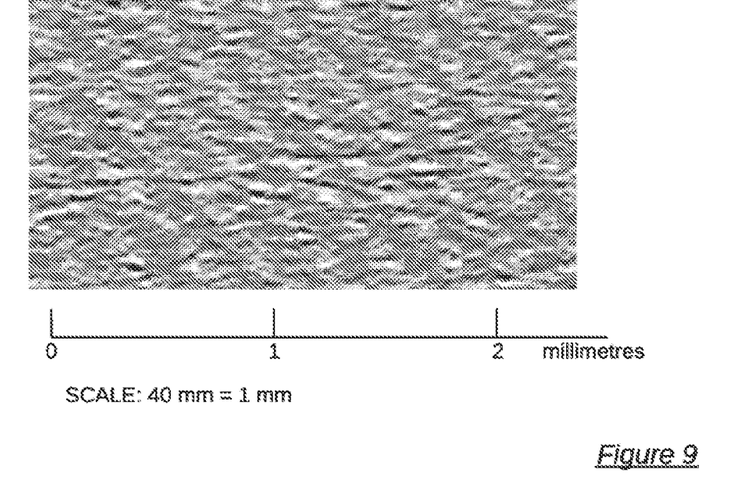
FIG. 9: is a computed tomography (CT) scan showing a section through a moulded pulp fibre product formed using a tool of an embodiment of the invention.

FIG. 9 is an image generated by a computed tomography (CT) scan, which shows a section through a moulded pulp fibre product formed using a tool of an embodiment. The pulp fibres are identifiable in FIG. 9 by the mid-grey and white regions in the image, in contrast with darker regions in the image that correspond with voids between fibres. As is evident from the image of FIG. 9, the pulp fibres extend predominantly in planes that are generally parallel to the left-right direction of the image; the major faces of the moulded pulp fibre product are oriented towards the top and bottom of the image. Further, the pulp fibres are densely packed, and the voids are small and follow the planes of the fibres. The fibre density, and the small size of the voids in moulded pulp fibre products formed using a tool of the embodiment provide beneficial barrier properties.

Moulded pulp fibre product that has been produced using a tool in accordance with an embodiment has been subjected to oxygen ($O_2$) barrier property tests. These tests have demonstrated that such moulded pulp fibre product can provide an $O_2$ barrier that is comparable with some commodity polymer-based packaging materials. As will be appreciated by persons skilled in the art, an $O_2$ barrier of this order is superior to the $O_2$ barrier that is achievable with packaging that is made solely with moulded pulp fibre products that are produced by traditional pulp fibre moulding processes.

Figure 10:
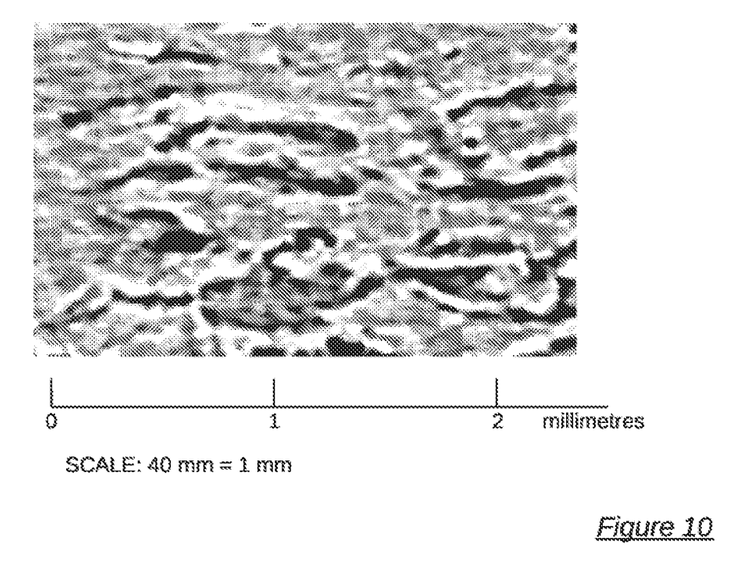
FIG. 10: is a computed tomography (CT) scan showing a section through a moulded pulp fibre product formed by a prior art thermoforming tool.

FIG. 10 is an image generated from computed tomography (CT) scan of a moulded pulp fibre product formed using a prior art thermoforming process. Again, the darker regions in FIG. 10 correspond with voids formed between the pulp fibres. From a comparison of FIGS. 9 and 10, it is evident that the voids in the product of FIG. 10 are significantly larger, compared with the voids in the product of FIG. 9. The size and interconnection of the voids in the product of FIG. 10 are significantly detrimental to the barrier properties of the product, as these interconnected voids provide pathways for migration of oxygen molecules within the product, thus enabling transmission of oxygen through the product.

In both FIGS. 9 and 10, the image shows the respective moulded pulp fibre product at a scale of 40:1 (in other words, at a 40× magnification).

The rigidity of the first layers 26 enables the tool 10 to produce moulded products that adopt the desired shape. In other words, the first layers 26 are substantially rigid such that the respective mould has structural stability for the tool 10 to produce a moulded product. In this regard, the rigidity of the first layers 26 will be determined by various factors, including material properties and dimensional characteristics of each first layer 26, as will be apparent to those skilled in the art.

In one example of the tool 10, the first layers 26 are made of metal, such as aluminium, aluminium alloys, tool steel, or the like. As shown in FIGS. 2 and 8, each of the first layers 26 has passageways 32 that extend from the interface between the respective first and second layers 26, 28, and the plenum chamber defined by the plenum box 22. As will be appreciated, certain aluminium alloys may be well-suited for the first layers 26, as these materials can have suitable resistance to deformation, and have suitable thermal conductivity.

In each mould 12a, 12b, the internal voids within the second layer 28 together with the passageways 30 in the first layer 26 form the fluid extraction paths through which fluid from within the wet pulp fibre material W is transported from the respective moulding surface 14 into the respective conduit 24.

In some instances, the material(s) of the second layers 28 can be formed of one or more fibrous materials, in which the internal voids are formed between the fibres. The fibres can be natural, synthetic, or a combination thereof. In one example, the second layers 28 can be felt, and/or other non-woven fibrous materials.

The second layers 28 can be formed of a single material, or multiple materials having different characteristics.

Fibrous material within the second layers 28 can be hydrophilic, which enables the liquid component from the wet pulp fibre material W (including water molecules) be drawn onto and across the fibre surfaces. As will be appreciated, this is achieved through high hydrogen bond strength with the fibre materials. When used within the second layers 28, hydrophilic fibre materials can aid in drawing the liquid component out of the wet pulp fibre material W.

Fibrous material within the second layers 28 can be hydrophobic, which enables the liquid component from the wet pulp fibre material W (including water molecules) to "sit" on the fibre surfaces. As will be appreciated, this is achieved through low hydrogen bond strengths with the fibre materials. When used within the second layers 28, hydrophobic fibre materials can aid in "giving up" the liquid component that has migrated from the wet pulp fibre material W and is contacting those fibres, which aids in the transition of that liquid component to its gaseous phase.

In some embodiments of the tool 10, it may be valuable for the second layers 28 to be hydrophilic at the mould surface 14 and hydrophobic at the interface with the first layer 26. The fibrous materials of second layers 28 can have a hydrophilic sublayer at the mould surface 14, and a hydrophobic sublayer at the interface with the first layer 26. As such the second layers 28 can be formed of at least two materials: a first fibrous material that forms the hydrophilic sublayer, and a second fibrous material that forms the hydrophobic sublayer.

As will be appreciated, a second layer 28 with first and second fibrous materials that have differing hydrophobicity/hydrophilicity can be beneficial both in drawing the liquid component out of the wet pulp fibre material W into the respective mould, and in giving up the liquid component in its transition to the gaseous phase.

The second layer can included an intermediate region between the hydrophilic and hydrophobic sublayers, within which the first and second fibrous materials are intermingled.

As will be appreciated, in embodiments in which the material of the second layers 28 is formed of one or more fibrous materials, the second layer can be resiliently compressible. This facilitates the take up of liquid from the wet pulp fibre material. As will also be appreciated, felt materials typically have a significantly lower heat transfer coefficient than metals, including aluminium, aluminium alloys, titanium, tool steels, and the like. Consequently, in use of the tool 10, the first layers 26 of the moulds 12 can be heated to temperatures that exceed the liquid-gas transition temperature of the liquid component of the wet pulp fibre material W, and this heat is transferred more slowly through the second layers 28 towards the wet pulp fibre material W.

The second layers 28 are releasably retained against the respective first layer 26. FIG. 3 is a schematic enlargement of Region B in FIG. 2, showing portions of the first and second layers 26, 28 of the upper mould 12a. The first layer 26 has a set of projections 34 that extend towards the mould surface, the direction of which is indicated in FIG. 3 by an arrow labelled 14. In the assembled mould 12a, the projections 34 extend into the material of the second layer 28. Each projection 34 has a barb-like formation that catches the fibres of the second layer 28, and thereby inhibits removal of the second layer 28 from the first layer 26. In this way, the second layer 28 is releasably retained against the first layer.

As will be appreciated, after the wet pulp fibre material W has been pressed, and the tool 10 is returning the moulds 12 to the first position (for example, when transitioning from the configuration illustrated in FIG. 6 to that illustrated in FIG. 7), it is desirable for the second layers 28 to be retained with the respective first layers 26. The projections 34 provide a mechanical interconnection between the first and second layers 26, 28 of the respective mould 12a, 12b that facilitates retaining the second layer 28 against the first layer 26.

In some embodiments, the first layer can be formed of multiple component parts that are interconnected or joined to form the first layer. By way of example, the first layer can include a chassis that supports a sheath. The chassis and sheath can be formed of different materials and/or by different techniques. The sheath, for example, can be formed by a 3D-printing technique, which enables formation of the projections. The sheath is then secured to the chassis, either permanently or releasably, thereby forming the first layer.

In embodiments in which the first layer of a mould is formed of multiple component parts, portions of the second layer 28 material can be alternatively or additionally be captured between two (or more) of those multiple component parts, to thereby retain the second layer to the first layer. In other words, the portions of the second layer material can be located and clamped between those component parts of the first layer.

Where a material of the second layer 28 is used that has thermoplastic characteristics, the respective mould can be assembled by a process that involves softening at least part of the second layer material, establishing interengagement of the second layer with surface irregularities in a contacting surface of the first layer, and solidifying the second layer. By way of example, this process may involve:

1. heating the first layer 26 to a temperature that exceeds the glass transition temperature of the second layer material,
2. placing the second layer 28 of the surface of the first layer 26, and
3. cooling the assembly formed in the second step to solidify the second layer material.

In this way, a region at the surface of the second layer 28 that contacts the first layer 26 during the second step will soften and interengage with surface irregularities of the first layer 26. On solidification of that surface region of the second layer 28, the first and second layers 26, 28 are interconnected.

Depending on the configuration of the tool 10, and the particular mould 12 (including the mould orientation, and the shapes of the first and second layers, and the shapes of the mould surfaces), the second layer 28 can overlay the first layer 26.

The tool 10 further includes a controller (not shown) that is configurable to adjust operational characteristics of the fluid extraction subsystem. In addition, the controller is also configurable to adjust the displacement force and/or displacement rate of the actuator 16 during displacement of the upper mould 12a towards the second position. In other words, the controller can adjust the driving force of the piston 18.

As will be apparent from FIGS. 4 to 8, during use of the tool 10 to form the moulded product P from wet pulp fibre material W, a temperature gradient across each of the second layers 28 and in a direction generally perpendicular to the mould surfaces 14 enables the liquid-gas transition temperature of the liquid component of the wet pulp fibre material W to occur within the second layers 28, as indicated in FIG. 8.

In this particular embodiment, adjusting the operational characteristics of the fluid extraction system involves the adjustment of the operational characteristics of the heating subsystem and/or the suction subsystem.

Adjusting the operating characteristics of the heating subsystem involves adjusting the temperatures in the first layers 26 in each mould 12a, 12b. The tool 10 can further include temperature sensors that sense the temperature of the first layers 26 in each mould 12a, 12b. The controller is configured to receive electronic signals representative of the sensed temperature from the temperature sensors. Thus, the controller can be configured to adjust the heat transferred to the first layer 26 of the respective mould 12a, 12b by the heating subsystem. In some examples, the adjustment can be based on the sensed temperature and a pre-determined temperature. As will be appreciated, it would be desirable for the heating subsystem to be capable of adjusting the temperature in the first layer 26 of each mould 12a, 12b independently of the other.

As will be appreciated, in the embodiment of FIG. 1, the controller can adjust the electrical power applied to the resistance heating elements 30, from zero to the maximum power of the respective heating element 30.

Adjusting the operating characteristics of the suction subsystem involves adjusting the pressure in the fluid extraction paths. To this end, in this particular embodiment, the suction power of the vacuum pump can be adjusted to alter the negative pressure within the conduits 24, plenum chambers, and fluid extraction paths.

The tool 10 can further include pressure sensors (not shown) that sense the internal pressures within the plenum boxes 22. The controller is configured to receive electronic signals representative of the sensed pressure from the pressure sensors. The controller can be configured to adjust the operation of the vacuum pump to thereby adjust the pressure in the fluid extraction paths. In some examples, the adjustment can be based on the sensed plenum chamber pressure and a pre-determined plenum chamber pressure.

The actuator assembly 16 can include a load sensor (not shown) that senses the displacement force applied by the actuator 16 to the upper mould 12a during displacement of the upper mould 12a towards the second position. In addition, the actuator assembly 16 can include a position sensor (not shown) that enables the position of the piston 18 with respect to the cylinder 20 to be determined. In this way, the position of the upper mould 12a can be inferred from the position sensor.

The controller is configured to receive electronic signals that are representative of the sensed displacement force from the load sensor, and to receive electronic signals representative of the position of the upper mould 12a. The controller is configured to adjust the displacement force applied by the actuator 16 to the upper mould 12a during displacement of that mould 12a towards the second position. This adjustment can be based on the sensed displacement force, the position of the upper mould 12a, or both. Further, the controller is configured to adjust the displacement force to adjust the rate of displacement of the upper mould 12a towards the second position. In this way, the displacement force and/or displacement rate can follow a predetermined profile based on the position of the upper mould 12a.

Figure 11:
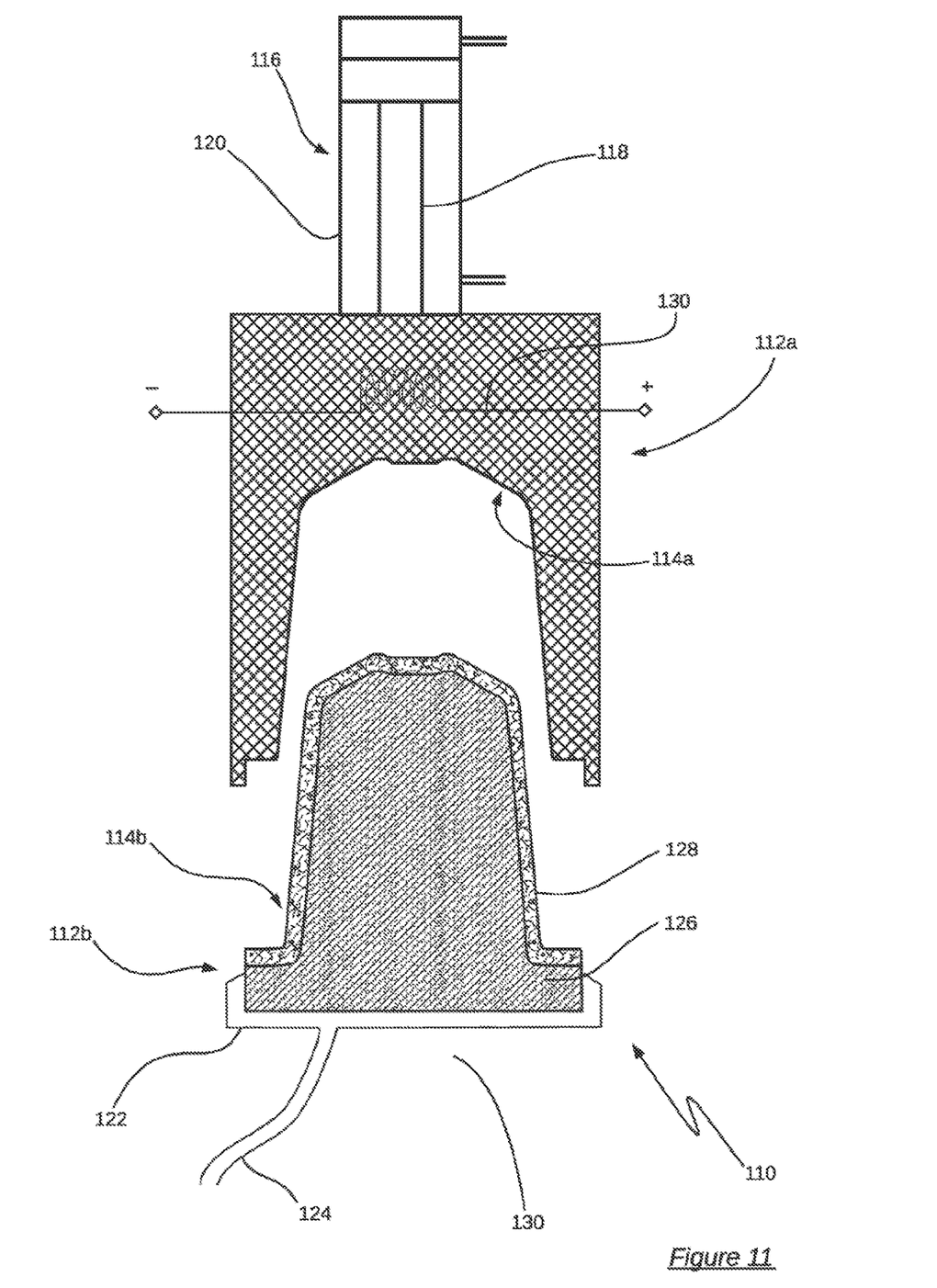
FIG. 11: is a schematic side elevation of a tool according to a second embodiment of the present invention.

FIG. 11 shows a tool 110 for use in a thermoforming process to form a moulded product from wet pulp fibre material. Parts of the tool 110 that are the same or similar to parts of the tool 10 have the same reference numbers with the prefix "1" and for succinctness, will not be described again.

One significant difference between the tool 10 and the tool 110 is that the mould surfaces 114 of the tool 110 are non-planar. Further, the upper mould 112a of the tool 110 is formed of a substantially rigid material and the mould surface 114a is defined by that material. The material of the upper mould 112a can be metal (such as aluminium, aluminium alloys, tool steel, titanium, and the like).

Fluid extraction paths extend through the lower mould 112b (only) of the tool 10. Thus, the lower mould 112b has two layers: a first layer 126 that is made of substantially rigid material, and a second layer 128. The first and second layers 126, 128 of the lower mould 112b are substantially similar to the first and second layers 26, 28 of the tool 128, but for having different shapes. In this particular embodiment, the upper mould 112a does not have fluid extraction paths. However, in some other instances, it may be desirable or necessary for a mould that is formed made of substantially rigid material to have passageways that extend from the mould surface through the mould to open into a plenum chamber.

The tool 110 further has a fluid extraction system that, in this embodiment, includes a suction subsystem, and a heating subsystem. The suction subsystem includes a plenum box 122 that is associated with the lower mould 112b, and a conduit 124 that interconnects with the plenum box 122. The plenum box 122 defines a plenum chamber that is in communication with rear side of the lower mould 112, as shown in FIG. 2. The suction subsystem also includes a vacuum pump (not shown), and the conduit 124 is interconnected with an intake of the vacuum pump. Thus, when the vacuum pump is in operation a negative pressure is induced in the fluid extraction paths.

The heating subsystem of the tool 110 includes electrical resistance heating elements 130 that extend through the upper mould 112a, and through the first layer 126 of the lower mould 112b. Thus, during use of the tool 110 to form a moulded product, the heating subsystem is operable to heat both the upper and lower moulds 112. In particular, the heating subsystem is to heat the upper mould 112a such that the mould surface 114a is at a temperature that is below the liquid-gas transition temperature of the liquid component of the wet pulp fibre material.

Further, the controller of the tool 110 is to be configured such that as the tool 110 is forming a moulded product from wet pulp fibre material, the moulds 112 are heated such that:
 the mould surface 114a of the upper mould 112a is at a temperature that is below the temperature of the mould surface 114b of the lower mould 112b;
 the mould surfaces 114 of both moulds 112 are below the liquid-gas transition temperature of the liquid component of the wet pulp fibre material; and
 the temperature of the first layer 126 of the lower mould 112b exceeds the liquid-gas transition temperature of the liquid component of the wet pulp fibre material W.

As will be appreciated, the above described structure and operation of the tool 110 will cause the liquid component of wet pulp fibre material (not shown in FIG. 11) that is between the mould surfaces 114 to migrate away from the upper mould 112a, and towards (and into) the lower mould 112b. Further, a temperature gradient is established through the wet pulp fibre material, and also through the second layer 128 so that the liquid-gas transition of the liquid component occurs within the second layer 128.

In use of the tool 110 to form a moulded product, the precise and defined mould surface 114a of the upper mould 112a is transferable to the moulded product, whilst ensuring that between the two mould surfaces 114, the liquid component of the wet pulp fibre material remains in liquid phase.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A pulp fibre material processing tool for use in a thermoforming process to form a moulded product from wet pulp fibre material, the tool comprising:
 two or more moulds that each have a moulding surface that is shaped to substantially define a portion of the external surface of the moulded product, at least one of the moulds being a displaceable mould that is displaceable between a first position that corresponds with the maximum separation of the moulds, and a second position that corresponds with the minimum separation of the moulds; and fluid extraction paths that extend through at least one of the moulds through which fluid is transportable away from the respective moulding surface;

an actuator assembly that is configured to displace the displaceable mould, and that includes at least one actuator to effect displacement of the displaceable mould; and a fluid extraction system that includes:
  a suction subsystem that is in communication with the fluid extraction paths and is configured to induce a negative pressure in the fluid extraction paths, and
  a heating subsystem that is configured to heat at least the mould having the fluid extraction paths,
  the fluid extraction system being configured to simultaneously reduce the moisture content of the pulp fibre material by inducing negative pressure in the fluid extraction paths and drawing fluid, including liquid component of the wet pulp fibre material, that is at the moulding surface of the respective mould through the fluid extraction paths via the suction subsystem, and transfer heat to the pulp fibre material by heating the mould having the fluid extraction paths;

wherein at least one of the moulds includes
  a first layer that is substantially rigid so as to form a support member of the mould, and that is in communication with the heating subsystem so that in use of the tool an elevated temperature is induced in the first layer by the heating subsystem, and
  a second layer that in use of the tool to form a moulded product from wet pulp fibre material is between the first layer and the wet pulp fibre material, and
wherein the second layer is formed of a material that has interconnected internal voids forming part of the fluid extraction paths and has a lower heat transfer coefficient than the first layer.

2. The pulp fibre material processing tool of claim 1, wherein the second layer defines the mould surface and, in use of the tool to form a moulded product from wet pulp fibre material, contacts the wet pulp fibre material.

3. The pulp fibre material processing tool of claim 1, wherein the first and second layers are formed of different materials.

4. The pulp fibre material processing tool according of claim 1, wherein material within the second layer is: hydrophobic, hydrophilic, or a combination thereof.

5. The pulp fibre material processing tool according of claim 1, wherein the second layer is formed of a material that is resiliently compressible.

6. The pulp fibre material processing tool according to claim 1, further comprising a controller that is configurable to adjust operational characteristics of the fluid extraction subsystem in use of the tool.

7. The pulp fibre material processing tool of claim 6, wherein the controller is configurable to adjust the displacement force applied by the actuator to the displaceable mould during displacement of the displaceable mould towards the second position.

8. The pulp fibre material processing tool of claim 7, further comprising a position sensor that is configured for use in determining the position of the displaceable mould between the first and second positions, and
wherein the controller is configured to receive electronic signals representative of the position of the displaceable mould, and to adjust the displacement force applied by the actuator to the displaceable mould, and/or to adjust the displacement rate of the displaceable mould during displacement of the displaceable mould towards the second position based on the sensed position of the displaceable mould.

9. The pulp fibre material processing tool of claim 6, wherein the controller is configurable to enable adjustment of any one or more of:
  the operating characteristics of the heating subsystem,
  the operating characteristics of the suction subsystem, and
  the displacement force and/or displacement rate of the actuator during displacement of the displaceable mould towards the second position,
such that, during use of the tool to form a moulded product from wet pulp fibre material, a temperature gradient is formed within the mould that has the first and second layers in a direction generally perpendicular to the mould surface, such that the mould surface of the respective mould is at a temperature that is below the temperature of the first layer, and is below the liquid-gas transition temperature of the liquid component of the wet pulp fibre material.

10. The pulp fibre material processing tool of claim 9, wherein the controller is configurable to adjust the temperature in the first layer in each mould that has fluid extraction paths by adjusting the operating characteristics of the heating subsystem.

11. The pulp fibre material processing tool of claim 10, further comprising one or more temperature sensors that sense the temperature of the first layer in each mould that has fluid extraction paths, and
wherein the controller is configured to receive electronic signals representative of the sensed temperature from the temperature sensors, and to adjust the heat transferred to the first layer of the respective mould by the heating subsystem based on the sensed temperature and a pre-determined temperature.

12. The pulp fibre material processing tool of claim 9, wherein the controller is configurable to adjust the pressure in the fluid extraction paths by adjusting the operating characteristics of the suction subsystem.

13. The pulp fibre material processing tool of claim 12, further comprising:
  at least one plenum chamber that is in communication with the fluid extraction paths,
  a vacuum pump having an intake,
  conduits that interconnect the plenum chamber with the intake, and
  one or more pressure sensors that sense the pressure within the plenum chamber,
  wherein the controller is configured to receive electronic signals representative of the sensed pressure from the pressure sensors, and to adjust the operation of the vacuum pump to thereby adjust the pressure in the fluid extraction paths based on the sensed plenum chamber pressure and a pre-determined plenum chamber pressure.

14. The pulp fibre material processing tool of claim 1, further comprising at least one plenum chamber that is in communication with the fluid extraction paths, a vacuum pump having an intake, and conduits that interconnect the plenum chamber with the intake.

15. The pulp fibre material processing tool of claim 1, wherein the second layer is releasably retained against the first layer.

16. The pulp fibre material processing tool of claim 1, wherein the second layer is formed of a fibrous material, having internal voids formed between the fibres.

17. The pulp fibre material processing tool of claim 1, wherein the mould surface of at least one of the moulds is non-planar.

18. The pulp fibre material processing tool of claim 17, wherein the mould surface of a first one of the moulds includes concave features, and the mould surface of a second one of the moulds includes convex features.

19. The pulp fibre material processing tool of claim 1, wherein a first one of the moulds has the first and second layers, and
- a second one of the moulds is formed of a substantially rigid material and the mould surface is defined by the substantially rigid material, and
- wherein the heating subsystem is configured to heat both the first and second moulds, and wherein the heating subsystem is configured to heat the second mould such that the mould surface of the respective mould is at a temperature that is below the liquid-gas transition temperature of the liquid component of the wet pulp fibre material.

20. The pulp fibre material processing tool of claim 19, wherein the heating subsystem is configured to heat the first and second moulds such that the mould surface of the second mould is at a temperature that is below the temperature of the mould surface of the first mould.

* * * * *